Oct. 11, 1960 H. A. STORCH 2,955,885
ANTI-ROTATION SPINDLE WASHER
Filed Sept. 16, 1957
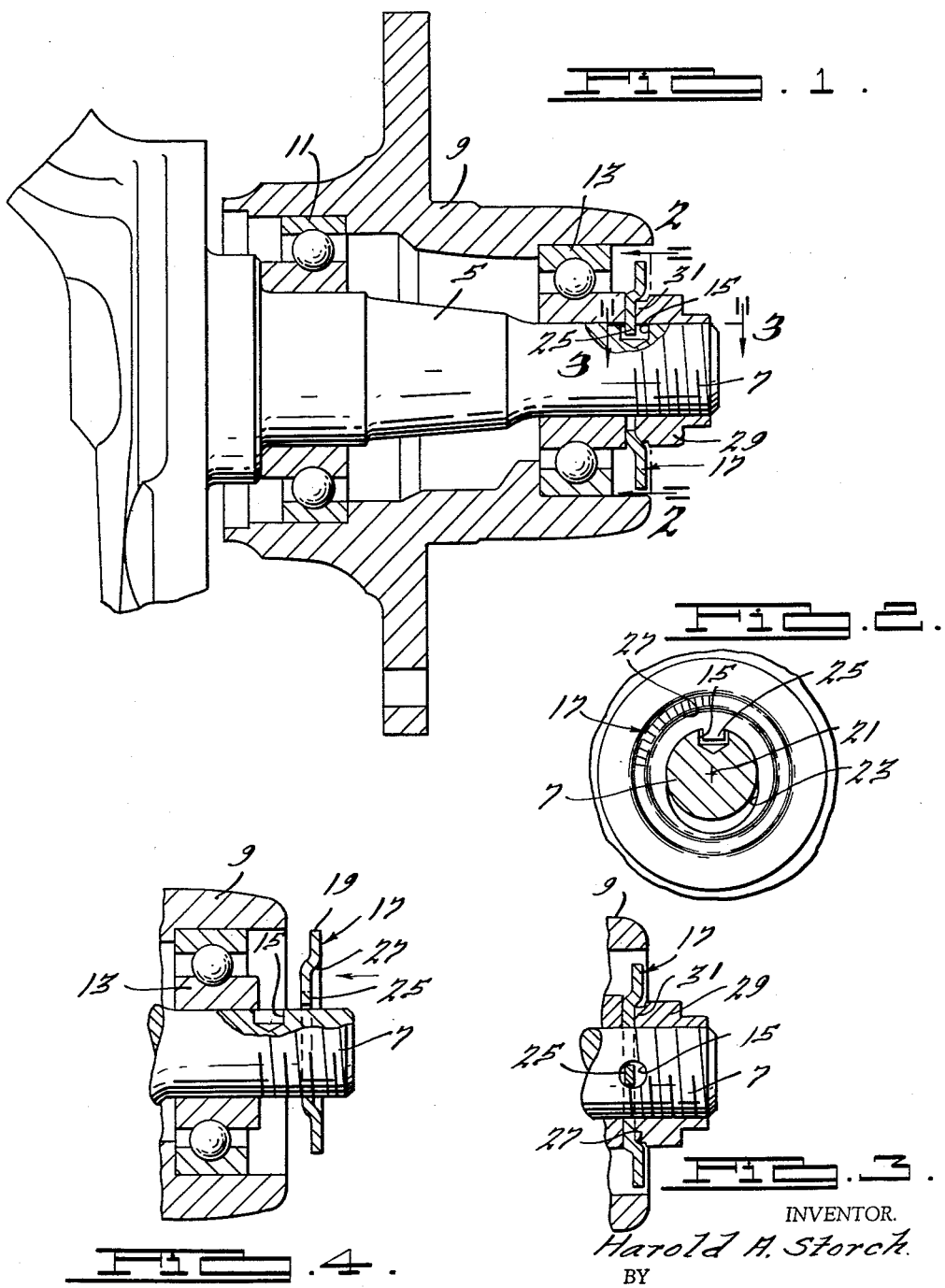
INVENTOR.
Harold A. Storch.
BY
Harness, Dickey & Pierce.
ATTORNEYS

United States Patent Office 2,955,885
Patented Oct. 11, 1960

2,955,885
ANTI-ROTATION SPINDLE WASHER

Harold A. Storch, Birmingham, Mich., assignor to Federal Screw Works, Detroit, Mich., a corporation of Michigan Filed Sept. 16, 1957, Ser. No. 684,219
8 Claims. (Cl. 308—236)

This invention relates to an improved anti-rotational washer, and to a novel and improved assembly of the type including a threaded shaft, an anti-rotational washer and a fastener means such as a nut connected with the shaft and engaging the washer.

While this invention is not limited to any specific type of assembly, it has been found to provide improved results in wheel spindle and hub assemblies. In most road vehicles a wheel or wheel hub is rotatably supported by bearings on a wheel spindle or shaft, and the wheel hub and bearings are retained against axial movement relative to the shaft by means of a nut and washer. In present day practice, an annular washer is employed in which the inner diameter and outer diameter are concentric and wherein a projection or tang extends radially inwardly into the central aperture of the washer from the washer inner periphery. The wheel spindle is provided with an elongated slot extending axially inwardly from the outer end of the spindle so that the washer may be slipped on to the spindle with the washer tang disposed in the slot. The washer is, therefore, nonrotatably connected with the spindle and is adapted to abut against the outer bearing which rotatably supports the wheel hub on the spindle. A nut is then threaded on the outer end of the spindle and tightened into engagement with the washer and both the nut and the spindle are drilled to receive a cotter key or pin which locks the nut against rotation relative to the spindle.

It will, of course, be appreciated that it is relatively expensive to form the axial elongated slot in the spindle which is adapted to receive the washer tang. It, likewise, is relatively expensive to drill the spindle and the nut so that a cotter pin can be inserted therethrough to lock the spindle and nut together.

It is an object of this invention to provide an improved assembly of the aforementioned type in which an improved and novel washer is nonrotatably connected with a threaded shaft or spindle without the necessity of providing an elongated slot in the spindle.

It is a still further object of this invention to provide an improved assembly of the aforementioned type in which the necessity of drilling the nut and spindle and connecting the two together by means of a cotter pin or key is eliminated.

It is a still further object of this invention to provide an assembly of the aforementioned type in which the nut or fastener and washer, when engaged, co-operate to retain the washer in its proper relationship relative to the spindle so as to effect the aforementioned results.

It is a still further object of this invention to provide an assembly of the aforementioned type which is less expensive to manufacture and produce and which is as durable and efficient as previously known assemblies.

It is a still further object of this invention to provide an improved and novel washer construction for use in an assembly of the aforementioned type to provide the aforesaid improved assembly advantages.

These and other objects of this invention will become more apparent from the following detailed description taken in conjunction with the accompanying drawing in which:

Figure 1 is a view partially in section and partially in elevation of a portion of a vehicle wheel hub and spindle assembly;

Fig. 2 is a sectional view of the structure illustrated in Fig. 1, taken along the line 2—2 thereof;

Fig. 3 is a sectional view of the structure illustrated in Fig. 1, taken along the line 3—3 thereof; and, Fig. 4 is a sectional view similar to Fig. 1 illustrating the washer of this invention being assembled on to a wheel spindle.

Referring now to the drawing, it will be seen that a vehicle wheel spindle 5 of any suitable type is illustrated, the outer end portion of which is threaded at 7. A wheel or wheel hub 9 is rotatably supported on the spindle 5 by means of an inner bearing assembly 11 and an outer bearing assembly 13. The outer bearing assembly 13 is mounted on the outer end portion of the spindle 5 so that the threaded spindle portion 7 is disposed outwardly of the bearing assembly. The outer periphery of the threaded spindle portion 7 is drilled to provide a radially inwardly extending aperture or opening 15, disposed adjacent to the outer face of the bearing assembly 13, after the bearing has been assembled with the spindle and wheel hub. A washer 17 is nonrotatably connected with the wheel spindle threaded end portion 7, with one face in engagement with the outer face of the bearing assembly 13.

The washer 17 has an annular outer periphery 19 which is illustrated as being concentric with the center 21 of the washer. The inner periphery of the washer defines a central aperture 23, which is illustrated as being of a generally oval shape. Therefore, as can be best seen in Fig. 2, the distance from the top of the central aperture 23 to the bottom of the aperture is greater than the distance from the left hand side of the aperture to the right hand side of the aperture. The aperture 23, therefore, is longer along the washer vertical axis, as illustrated in Fig. 2, than along the horizontal axis. The washer is provided with a radially inwardly extending tang or projection 25, extending inwardly from the washer inner periphery into the aperture 23 defined thereby. The tang is shown as being centered on the vertical axis of the central aperture, as illustrated in Fig. 2, and the distance from the inner end of the tang to the opposed inner peripheral portion of the washer is slightly greater than the diameter of the wheel spindle threaded portion 7 so that the washer can be inserted on to the spindle from the outer end thereof. When the washer is inserted over the spindle to its innermost position, in engagement with the bearing assembly 13, the washer tang 25 is an alignment with the spindle aperture 15 and drops into said aperture so that the washer 17 is nonrotatably connected with the spindle 5.

The washer 17 is formed or stamped so that at least the outer face thereof is provided with an annular shoulder 27 which is generally concentric relative to the center 21 of the washer. The shoulder 27 is provided in the instant embodiment by depressing the center portion of the washer relative to the outer peripheral portion thereof, thereby forming the shoulder 27. A nut or other suitable fastener 29 is threaded on to or otherwise connected to the outer end of the spindle 5 and tightened into engagement with the washer 19. The nut 29 is illustrated as being provided on its inner end with a hub or collar portion 31 which engages the outer face of the washer at the shoulder 27 or slightly radially inwardly thereof. The engagement of the nut with the shoulder 27 of the washer prevents the washer from moving upwardly relative to the spindle and prevents the washer tang 25 from moving out of engagement with the spindle aperture 15. Furthermore, the shoulder 27 is effective to perform its intended function irrespective of the angular position in which the nut may be left. Therefore, in this assembly the washer is nonrotatably connected to the spindle and it is only necessary to spot drill the spindle and not mill or otherwise form a slot in the spindle which extends inwardly from the outer end thereof.

The illustrated nut 29 is preferably a lock nut such as the type illustrated and described in Patent No. 2,464,728. This type of nut will withstand vibrations and shocks and will not back off or rotate relative to the spindle after it has been tightened into position. Thus, the necessity of drilling the spindle and the nut and the use of cotter pins to lock the nut against rotation on the spindle is eliminated and an improved, relatively inexpensive spindle or shaft assembly is provided.

What is claimed is:

1. A washer adapted to be nonrotatably connected with a threaded shaft of a predetermined diameter, said washer having a central aperture and a tab projecting radially inwardly into said aperture from a portion of said washer defining said aperture, the distance between the inner end of said tab and the opposed wall portion of said aperture being greater than predetermined diameter of a threaded shaft onto which said washer is insertable, integral annular shoulder means projecting from one face of said washer radially outwardly of said aperture and disposed concentrically relative to the center of said washer.

2. A washer adapted to be nonrotatably connected with a threaded shaft of a predetermined diameter, said washer having a central oval aperture and a tab projecting radially inwardly into said aperture from a portion of said washer defining said aperture and lying adjacent to the long axis of said oval aperture, the distance between the inner end of said tab and the opposed portion of said aperture wall being at least as great as the distance across said aperture along the short axis thereof and being greater than the predetermined diameter of a threaded shaft onto which said washer is insertable, and an integral continuous annular shoulder formed in one face of said washer radially outwardly of said aperture and concentric with the center of said washer.

3. In combination, a shaft having an opening extending radially inwardly from the outer periphery thereof and spaced inwardly from the outer end thereof, a washer having a central aperture and a tab projecting radially inwardly into said aperture from a portion of said washer defining said aperture, said tab having its inner end disposed in said shaft opening, the distance between the inner end of said tab and the portion of the washer defining the opposed portion of said aperture being greater than the diameter of said shaft, an integral annular shoulder means formed on one face of said washer radially outwardly of said washer aperture and disposed concentrically relative to the center of said washer, and a fastener connected with said shaft and having a surface engaging said washer shoulder means so as to retain said washer tab in said shaft opening.

4. In combination, a shaft having an opening extending radially inwardly from the outer periphery thereof and spaced inwardly from the outer end thereof, a washer having a central oval aperture and a tab projecting radially inwardly into said oval aperture from a portion of said washer defining the same, said tab being disposed adjacent the long axis of said oval aperture and the distance between the inner end of said tab and the opposed portion of said washer aperture wall being at least as large as the distance across said aperture along the short axis thereof and being greater than the diameter of said shaft so that said washer can be inserted on to said shaft from the outer end thereof, said washer tab having its inner end disposed in said shaft opening, integral annular shoulder means spacedly surrounding said aperture and formed by offsetting the material immediately surrounding said aperture from the plane of the material radially outwardly thereof, and a fastener connected with said shaft and having a surface engaging said washer shoulder means so as to retain said washer tab in said shaft opening.

5. In combination, a wheel spindle having the outer end thereof threaded, said spindle having a radially inwardly extending opening formed in the outer periphery thereof and spaced inwardly from the outer end thereof, a bearing assembly sleeved on said spindle, a washer having a central aperture and a tab projecting radially inwardly into said aperture from the portion of the washer defining said aperture, said washer being sleeved on said spindle and having one face engaging said bearing assembly and the inner end of said tab disposed in said shaft opening, the distance between the inner end of said tab and the portion of said washer defining the opposed portion of said washer aperture being greater than the diameter of the threaded portion of said spindle so that said washer can be sleeved on said spindle from the outer end thereof, integral shoulder means formed on the outer face of said washer radially outwardly of said washer aperture and disposed substantially concentrically with respect to the center of said washer, and a nut threaded on the outer end of said spindle into engagement with said washer so that said washer is tightly confined between said bearing assembly and said nut, said nut having a surface engaging said washer shoulder means so as to retain said washer tab in said shaft opening.

6. A washer adapted to be non-rotatably connected with a threaded shaft of a predetermined diameter, said washer having a central aperture and a tab projecting radially inwardly into said aperture from a portion of said washer defining said aperture, the distance between the inner end of said tab and the opposed wall portion of said aperture being greater than the predetermined diameter of a threaded shaft onto which said washer is insertable, and an annular shoulder spacedly surrounding said aperture formed by offsetting the material immediately surrounding said aperture from the material radially outwardly thereof.

7. A generally dish-shaped washer formed from a unitary piece of sheet material and having a central oval aperture and a tab projecting radially inwardly into said aperture at a long end thereof, an area of material surrounding said aperture being offset from the material radially outwardly thereof to form a continuous annular shoulder spacedly surrounding said aperture and generally concentric with the center thereof.

8. In combination, a wheel spindle having the outer end thereof threaded, said spindle having a radially inwardly extending opening formed in the outer periphery thereof and spaced inwardly from the outer end thereof, a bearing assembly sleeved on said spindle, a washer having a central aperture and a tab projecting radially inwardly into said aperture from the portion of the washer defining said aperture, said washer being sleeved on said spindle and having one face engaging said bearing assembly and the inner end of said tab disposed in said spindle opening, the distance between the inner end of said tab and the portion of said washer defining the opposed portion of said washer aperture being greater than the diameter of the threaded portion of said spindle so that said washer can be sleeved on said spindle from the outer end thereof, an integral annular shoulder formed on said washer radially outwardly of said washer aperture by offsetting the material immediately surrounding said washer aperture from the plane of the material radially outwardly thereof, and a nut threaded on the outer end of said spindle into engagement with said shoulder so that said washer is confined between said bearing assembly and said nut and said tab is retained in said shaft opening.

References Cited in the file of this patent

UNITED STATES PATENTS

| | | |
|---|---|---|
| 659,068 | Ives | Oct. 2, 1900 |
| 887,574 | Barr | May 12, 1908 |
| 1,233,342 | Gracey | July 17, 1917 |
| 1,324,911 | Lamb | Dec. 16, 1919 |